United States Patent [19]

Mainprize

[11] Patent Number: 4,819,600
[45] Date of Patent: Apr. 11, 1989

[54] SIGNAL INTEGRATING CIRCUIT

[75] Inventor: David Mainprize, Sutton Coldfield, England

[73] Assignee: Lucas Industries public limited company, Birmingham, England

[21] Appl. No.: 124,578

[22] Filed: Nov. 24, 1987

[30] Foreign Application Priority Data

Dec. 6, 1986 [GB] United Kingdom ............... 8629247

[51] Int. Cl.[4] ........................................... F02P 5/155
[52] U.S. Cl. ....................................... 123/425; 73/35
[58] Field of Search ................. 123/425, 435; 73/35

[56] References Cited

U.S. PATENT DOCUMENTS 4,351,282 9/1982 Utsumi et al. .................... 123/425
4,458,646 7/1984 Suzuki et al. .................... 123/425

Primary Examiner—Tony M. Argenbright
Attorney, Agent, or Firm—Nixon & Vanderhye

[57] ABSTRACT

A rectifying and integrating circuit, particularly in a knock-detection system for an internal combustion engine, comprises an operational amplifier, an integrating capacitor with one side connected to the amplifier output and its other side connected to the signal input of the amplifier, a first rectifying device connecting the amplifier output to the one side (i.e. output side) of the integrating capacitor, and a second rectifying device connecting the amplifier output to its signal input. The signal input current is balanced by feedback through either the first rectifying device and the capacitor or through the other rectifying device, depending on the polarity of the input. Integration occurs on one polarity. In the absence of a rectifier amplifier preceding a separate integrator, errors due to input offset voltages of the rectifier amplifier are avoided.

12 Claims, 1 Drawing Sheet

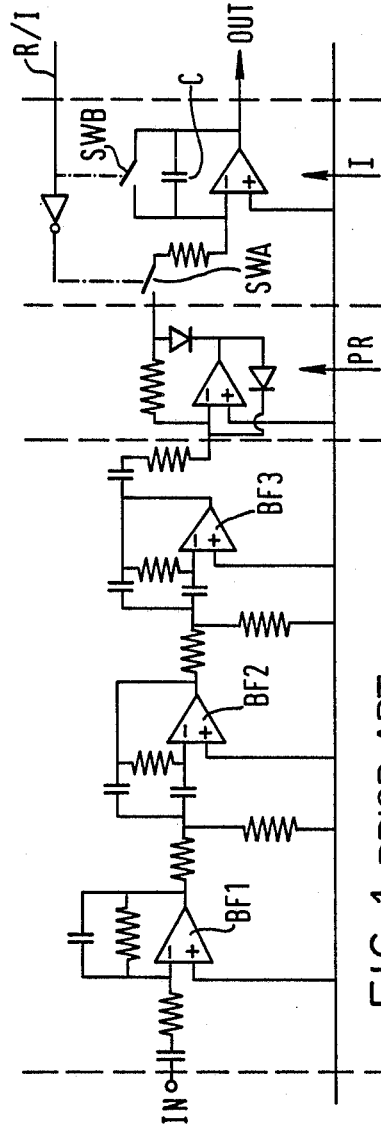
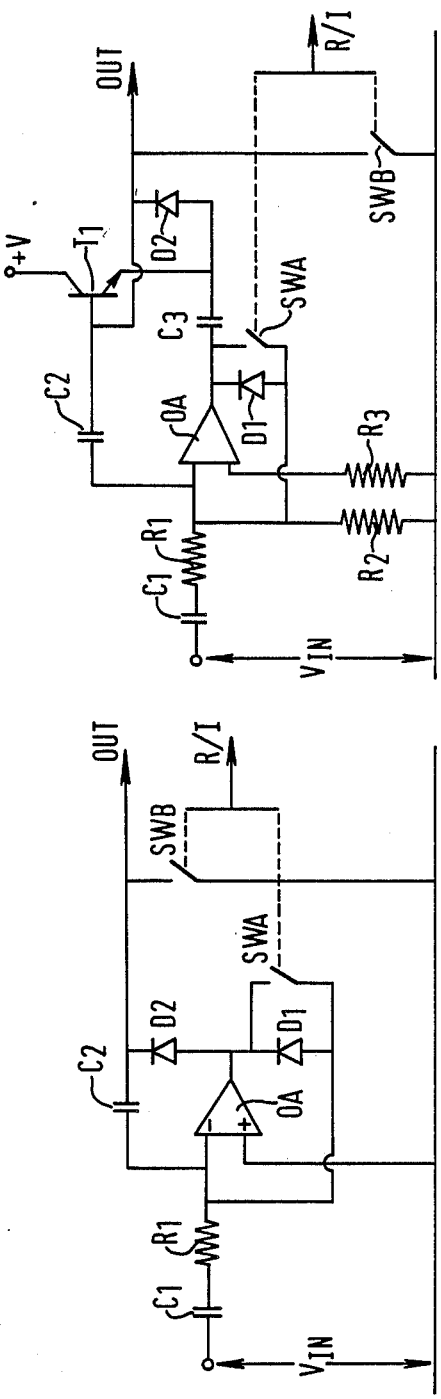
FIG. 1. PRIOR ART
FIG. 2.
FIG. 3.

SIGNAL INTEGRATING CIRCUIT

This invention relates to a circuit serving both to rectify and integrate an electrical signal and having particular utility in a knock detection system for an internal combustion engine.

In order to avoid the risk of damage to an internal combustion engine due to detonation, it is known to provide a system for detecting the effect known as knock and adjust the ignition timing accordingly so as to terminate the knock condition. A known knock detection system comprises a piezoelectric transducer attached to the engine and serving to convert engine vibrations into an electric signal. A band-pass filter is used to separate the required knock-representing signal from additional vibration and noise which is present and the output of the band-pass filter is fed to a precision rectifier and thence to an integrator. A microprocessor controls the integrator in order to provide an output signal which is proportional to the knock signal level over a predetermined period, which is selected to correspond to the time interval (for each cylinder of the engine) during which knock would be expected to occur and thus to reduce those background noise components which coincide with the pass band of the filter. The output signal of the integrator is determined by the microprocessor and used for controlling the ignition timing and other parameters.

The amplitude of the knock signal is found to vary considerably depending upon the operating conditions of the engine. The gain of the filter is necessarily, for practical purposes, predetermined according to the maximum signal levels to be processed. Therefore, under some conditions the level of the output signal from the filter is very low: under these conditions the input offset voltage errors of the operational amplifiers used for the rectifier and integrator have a large effect, particularly at low engine speeds because of the relatively long integration time then employed. The input offset voltage error of the rectifier amplifier is transferred to its output and adds to the input of the integrator. A large error in the integrator output level is therefore caused but in addition the integrator gain can require limiting in order to prevent the error consumming the whole of the available integrator output range.

We have now devised a combined rectifying and integrating circuit which overcomes the drawbacks described above due to input offset voltage errors of the operational amplifiers employed.

In accordance with this invention, there is provided a rectifying and integrating circuit, comprising an operational amplifier having an input for receiving a signal to be rectified and integrated, an integrating capacitor having one side connected to an output of the operational amplifier and its other side connected to said output of the operational amplifier, said one side of the integrating capacitor delivering an output signal from the circuit, a first rectifying device connecting the output of the operational amplifier to said one side of the capacitor and a second, oppositely-poled rectifier device connecting the output of the operational amplifier to its said input.

When the input signal is of one polarity, current flows through the first rectifying device and the integrating capacitor to balance the input current and provide a voltage at the output of the circuit. However when the input signal is of the opposite polarity, current flows through the second rectifying device to balance the input current and maintain the amplifier input at a fixed voltage. Thus in effect the input signal is rectified for its one polarity and integrated.

For resetting the integrating capacitor, switches are provided one in parallel with the second rectifying device and the other between the output side of the integrating capacitor and ground. Both switches are closed for resetting, the one switch connecting the amplifier output to its input to hold the input at a voltage balancing the input offset and maintaining the output near a zero voltage level, and the other switch discharging the integrating capacitor to zero voltage at its output side.

A diode pump arrangement may be connected between the amplifier output and the integrating capacitor in order that the integrator output may extend beyond the output voltage range of the amplifier itself.

Embodiments of this invention will now be described by way of examples only and with reference to the accompanying drawings, in which:

FIG. 1 is a schematic circuit diagram of a prior art knock detection circuit;

FIG. 2 is a diagram of a combined rectifying and integrating circuit in accordance with this invention, which circuit may replace the separate rectifying and integrating circuits of the knock detection system shown in FIG. 1; and FIG. 3 is a diagram of a modification of the circuit shown in FIG. 2.

Referring to FIG. 1 of the drawings, there is shown a prior art knock detection system. A signal from a piezoelectric transducer, attached to the internal combustion engine, is applied to the input IN of a band-pass filter comprising, in the example shown, three successive operational amplifier stages $BF_1$, $BF_2$, $BF_3$. The output of the band-pass filter is fed to a precision rectifier circuit PR comprising an operational amplifier connected generally as shown, and the output of this rectifier is fed via a switch SWA to an integrator circuit I. This integrator circuit comprises an operational amplifier with the output from the rectifier applied to one of its inputs and an integrating capacitor C connected between its output OUT and that input. The output OUT is connected via an analogue-to-digital converter to a microprocessor serving to measure the integrator output and in consequence to control the ignition timing of the engine. The microprocessor also actuates switch SWA and another switch SWB in parallel with the integrating capacitor C, for controlling operation of the integrating circuit. In practice switches SWA and SWB are electronic switches and are controlled over a reset/integrate control line R/I from the microprocessor, with switch SWA controlled via an inverter as shown. Thus, for resetting, the control line serves to open switch SWA and close switch SWB for discharging the capacitor C, whilst for the integration period the control line closes switch SWA and opens switch SWB. Knock detection systems such as that shown in FIG. 1 are however prone to the drawbacks described above due to input offset voltage errors of the operational amplifiers of the precision rectifiers.

Referring to FIG. 2 of the drawings, there is shown a combined rectifying and integrating circuit in accordance with this invention, which may be used to replace both the precision rectifying circuit PR and the integrating circuit I of knock detection systems such as shown in FIG. 1. The circuit shown in FIG. 2 comprises an operational amplifier OA and the knock signal delivered by the band-pass filter is applied to one input (the inverting input) of the operational amplifier via a coupling capacitor $C_1$ and a series resistor $R_1$. The other (non-inverting) input of the operational amplifier is connected to ground. An integrating capacitor $C_2$ is connected with one side to the amplifier output and its other side to the signal input of the amplifier in the usual way, and the one side of the capacitor $C_2$ providing the output OUT of the integrating circuit. However, a diode rectifying device $D_2$ is connected between the amplifier output and the one side or output side of the capacitor $C_2$ (and poled for conduction when the amplifier output is positive), whilst an oppositely-poled diode rectifying device $D_1$ is connected between the amplifier output and its signal input. Electronic switches SWA and SWB are provided, one in parallel with diode $D_1$ and the other between the capacitor output side and ground, and are controlled by the microprocessor.

The operation of the circuit shown in FIG. 2 is as follows. During the reset period, the microprocessor serves to close both switches SWA and SWB. Switch SWA therefore connects the amplifier output back to its signal input to ensure that this input is held at a voltage exactly balancing the input offset voltage and thus maintaining the amplifier output near the zero volts level. Whilst the signal input is held at this voltage level the integrating capacitor is discharged through switch SWB to zero voltage on its output side. Then during the integration period, both switches SWA and SWB are open: when the knock signal from the band-pass filter is of negative voltage, it is integrated because current flows through the integrating capacitor $C_2$ via diode $D_2$ balancing the input current and producing a positive voltage at the output OUT. When the knock signal from the bandpass filter is of positive voltage, there is no integration: such a positive input voltage causes the amplifier output to go negative, passing current through diode $D_1$ to balance the input current and maintain the amplifier input at a fixed voltage.

It will be appreciated that the series resistor $R_1$ serves to convert the input voltage signal $V_{in}$ to a current signal which is then balanced by one or other of the two feedback paths depending on the polarity of the input. The coupling capacitor $C_1$ blocks any DC voltage present in the output from the band-pass filter and also blocks the offset voltage of the operational amplifier OA, thus preventing DC voltages having any effect on the integrator output OUT.

It will also be appreciated that, during reset, the input offset voltage of the amplifier OA is exactly balanced so that the voltage can have no effect during the integration period. The only drift or error which can occur would be due to the leakage current of the diode $D_1$ and the biassing current of the amplifier. These can be reduced to a minimum by choosing components of very low leakage and bias current, and in particular the operational amplifier preferably comprises CMOS devices.

However, a low cost operational amplifier using bipolar devices may be employed if input biassing resistors $R_2$, $R_3$ are added, as shown in FIG. 3. This arrangement results in greater rates of drift than those exhibited by e.g. junction FET or MOSFET input amplifiers, but still provides a considerable improvement over circuits of the type shown in FIG. 1. The circuit of FIG. 3 also includes a diode pump arrangement, allowing the integrator output OUT to extend beyond the output voltage range of the operational amplifier OA itself. Thus an additional capacitor $C_3$ is connected between the junction of the amplifier output with the diode $D_1$ and switch SWA on the one hand, and the diode $D_2$ on the other hand: a transistor $T_1$ is connected as an emitter-follower with its collector connected to the positive supply $+V$, its emitter connected to the output side of capacitor $C_3$ and its base connected to the output side of the integrating capacitor $C_2$. During negative excursions of the amplifier output, the capacitor $C_3$ is charged by the emitter follower and this charge is transferred to the integrating capacitor $C_2$ via diode $D_2$ during the positive excursions of the amplifier output, and so on.

What is claimed is:

1. A rectifying and integrating circuit, comprising:
    an operational amplifier having an input for receiving a signal to be rectified and integrated;
    an integrating capacitor having one side connected to an output of the operational amplifier and its other side connected to said input of the operational amplifier, said one side of the integrating capacitor delivering an output signal from the circuit;
    a first rectifying means connecting the output of the operational amplifier to said one side of the capacitor; and
    a second, oppositely-poled rectifying means connecting the output of the operational amplifier to its said input, said second rectifying means and said capacitor comprising a sole means for feeding said output signal back to said input during integration.

2. A rectifying and integrating circuit comprising:
    an operational amplifier having an input for receiving a signal to be rectified and integrated;
    an integrating capacitor having one side connected to an output of the operational amplifier and its other side connected to said input of the operational amplifier, said one side of the integrating capacitor delivering an output signal from the circuit;
    a first rectifying means connecting the output of the operational amplifier to said one side of the capacitor;
    a second, oppositely-poled rectifying means connecting the output of the operational amplifier to its said input; and
    a first switching means connected across said second rectifying means, and control means for closing said switching means during resetting of the integrating capacitor.

3. A rectifying and integrating circuit comprising:
    an operational amplifier having an input for receiving a signal to be rectified and integrated;
    an integrating capacitor having one side connected to an output of the operational amplifier and its other side connected to said input of the operational amplifier, said one side of the integrating capacitor delivering an output signal from the circuit;
    a first rectifying means connecting the output of the operational amplifier to said one side of the capacitor;
    a second, oppositely-poled rectifying means connecting the output of the operational amplifier to its said input; and
    a switching means connected in shunt with the output side of the capacitor, and control means for closing said switching means for resetting the integrating capacitor.

4. A rectifying and integrating circuit as claimed in claim 1, further comprising a resistor in series with said input of the operational amplifier, serving to convert a voltage said input signal to a current signal which is then balanced through one of the integrating capacitor and said second rectifying means depending on the polarity of the input voltage signal.

5. A rectifying and integrating circuit as claimed in claim 1, in which said operational amplifier comprises CMOS devices.

6. A rectifying and integrating circuit as claimed in claim 1, in which said operational amplifier comprises bipolar devices and the inputs of said operational amplifier are provided with biassing resistors.

7. A rectifying and integrating circuit comprising:
an operational amplifier having an input for receiving a signal to be rectified and integrated;
an integrating capacitor having one side connected to an output of the operational amplifier and its other side connected to said input of the operational amplifier, said one side of the integrating capacitor delivering an output signal from the circuit;
a first rectifying means connecting the output of the operational amplifier to said one side of the capacitor;
a second, oppositely-poled rectifying means connecting the output of the operational amplifier to its said input; and
a diode pumping means connected to the output of said operational amplifier.

8. A rectifying and integrating circuit as claimed in claim 7, in which said diode pumping means comprises an additional capacitor connected between the output of said operational amplifier and said first rectifying means, and means for providing charging current to said additional capacitor when the output of the operational amplifier is one polarity, the charge thus provided to the additional capacitor transferring to the integrating capacitor via said first rectifying means when the amplifier output changes polarity.

9. A rectifying and integrating circuit as claimed in claim 8, in which said charging current means comprises a transistor with its base connected to said one side of the integrating capacitor.

10. A knock detection system for an internal combustion engine, comprising:
a rectifying and integrating circuit;
a transducer for attaching to the internal combustion engine and providing a signal to said rectifying and integrating circuit; and
means, responsive to the output of the rectifying and integrating circuit, for controlling ignition timing of said engine, said rectifying and integrating circuit comprising:
an operational amplifier having an input for receiving a signal to be rectified and integrated;
an integrating capacitor having one side connected to an output of the operational amplifier and its other side connected to said input of the operational amplifier, said one side of the integrating capacitor delivering an output signal from the circuit;
a first rectifying means connecting the output of the operational amplifier to said one side of the capacitor; and
a second, oppositely-poled rectifying means connecting the output of the operational amplifier to its said input, said second rectifying means and said capacitor comprising a sole means for feeding said output signal to said input during integration.

11. A rectifying and integrating circuit, comprising:
an operational amplifier having an input for receiving a signal to be rectified and integrated;
an integrating capacitor having one side connected to an output of the operational amplifier and its other side connected to said input of the operational amplifier, said one side of the integrating capacitor delivering an output signal from the circuit;
a first rectifying means connecting the output of the operational amplifier to said one side of the capacitor;
a second, oppositely-poled rectifying means connecting the output of the operational amplifier to its said input; and
means for resetting the integrating capacitor prior to permitting it to charge from the input signal.

12. A knock detection system for an internal combustion engine, comprising:
a rectifying and integrating circuit;
a transducer for attaching to the internal combustion engine and providing a signal to said rectifying and integrating circuit; and
means, responsive to the output of the rectifying and integrating circuit, for controlling ignition timing of said engine, said rectifying and integrating circuit comprising:
an operational amplifier having an input for receiving a signal to be rectified and integrated;
an integrating capacitor having one side connected to an output of the operational amplifier and its other side connected to said input of the operational amplifier, said one side of the integrating capacitor delivering an output signal from the circuit to said controlling means;
a first rectifying means connecting the output of the operational amplifier to said one side of the capacitor;
a second, oppositely-poled rectifying means connecting the output of the operational amplifier to its said input; and
means for resetting the integrating capacitor prior to permitting it to charge from the input signal.

* * * * *